Patented June 9, 1936

2,043,513

UNITED STATES PATENT OFFICE 2,043,513

METHOD OF REFINING ROSIN

Irvin W. Humphrey, Wharton, N. J., assignor to Hercules Powder Company, Wilmington, Del., a corporation of Delaware No Drawing. Application April 25, 1930, Serial No. 447,423

13 Claims. (Cl. 87—2)

My invention relates to a method of refining rosin, more particularly by the removal of color bodies therefrom.

As is well known, rosin, such as gum rosin, obtained by tapping live pine trees, and wood rosin, obtained from pine stump wood, usually obtained by extracting pine stumps or downwood with a solvent, contain color bodies which give the rosin an objectionable color, especially when the rosin is to be used in products where lightness of color is desirable or essential.

Heretofore various substances have been known to exert a selective solvent power on color bodies contained in rosin and certain substances are capable of use in the refining of rosin as such, or when the rosin is carried in solution in a suitable solvent, since such substances, in addition to their capacity for selectively dissolving color bodies, are, to a greater or less degree, separable from rosin, or from rosin in solution, or are capable of being rendered separable therefrom, for example, through temperature control; while certain other substances which possess a selective solvent power on color bodies contained in the rosin are either of limited efficacy or have been incapable of use heretofore in the refining of rosin in view of their miscibility with rosin solution or their tendency to crystallize on separation, for example, from a rosin solution with consequent loss of color bodies which otherwise would be selectively dissolved and removed thereby if the substance could be separated from the rosin solution in liquid phase.

Now, it is the object of my invention to provide a method for the refining of rosin, more particularly for the removal of color bodies therefrom, by which certain substances having a selective solvent power on color bodies may be rendered more effective; also by which certain substances having a selective solvent power on color bodies, but which heretofore have not been capable of efficient use, may be rendered effective.

In accordance with the method embodying my invention broadly, I subject rosin to treatment with a substance carried by a vehicle in the presence of which the substance will be an effective solvent for color bodies contained in the rosin and through the medium of which the substance and color bodies dissolved thereby may be effectively separated from the refined rosin as such or in solution. The vehicle need not itself be primarily a selective solvent for color bodies contained in the rosin, though it may be itself a good solvent for color bodies and it may have a capacity under certain conditions to dissolve rosin.

In the practical adaptation of the method in accordance with my invention, as has been indicated, the substance used may be one having a selective capacity for dissolving color bodies contained in rosin and capable of use for the effective refining of rosin as such, or when the rosin is in solution in a suitable solvent therefor, or one possessing a capacity for selectively dissolving color bodies, but of no material efficiency due to tendency to crystallize without color bodies, on separation from rosin in solution, or not capable of separation from the rosin, or one which will be rendered effective as a solvent therefor when carried by the vehicle. The vehicle, as has been indicated, will be of such character as to render the substance effective where it is not an effective solvent for color bodies and to render effective solvents for color bodies more effective. The vehicle will possess the characteristic of substantial immiscibility, or capacity for being rendered substantially immiscible with the rosin solution.

In the practical adaptation of the method embodying my invention, I may use with increased efficiency, various substances which are normally liquid at room temperature as, for example, o-chlorophenol, quinoline, benzyl alcohol, allyl alcohol, acetaldehyde, tetrahydrofurfuryl alcohol, acetonitrile, acetic acid, acetone, liquid cresol, dry pyridine and methanol, methyl furfural, creosote, paraldehyde, methyl borate, methyl aniline, etc. I may also use various crystalline substances such as, for example, furoic acid, benzoic acid, anisic acid, formanilid, p-chloraniline, vertraldehyde, salicylic acid, 2, 4 dichlorophenol, p-cresol, o-cresol, furfuramide, phenacetin, phenoxyacetic acid, vanillin, etc., etc., or I may use certain organic or inorganic salts such as, for example, sodium abietate, sodium cyanide, sodium hydroxide, etc.

In the case of certain of the substances mentioned above, for illustrative purposes, the application of my method results in increase of the efficiency of the color body solvent, or the elimination of the necessity for temperature control to effect separation of the color body solvent from the gasoline-rosin solution; while in other cases the application of my method renders the solvent, as for example, those tending to crystallize, effective.

As the vehicle by which certain effective color body solvents are rendered more effective and by which solvents of little or no efficiency are rendered effective, I may use a suitable polyhydric alcohol, as, for example, a trihydric alcohol, as glycerin, or a dihydric alcohol, as ethylene, propylene, diethylene, etc. glycols, which possess no large solvent action on color bodies, or I may use as the vehicle a substance which itself possesses a substantial solvent power for color bodies, as, for example, furfural, ethylene chlorohydrin, phenol, diethylene glycol monomethyl ether, etc.

In effecting the refining of rosin by the method in accordance with my invention, as has been indicated, the rosin may be treated in solution in a suitable solvent therefor, such, for example, as gasoline, petroleum ether, or other light petroleum hydrocarbon, pinene, turpentine, etc. Where the solvent substance used permits treatment of the rosin as such, conditions are controlled so as to effect solution of the rosin in the vehicle carrying the solvent substance rendered effective or more effective, as the case may be, by suitable control of temperature, and the rosin is subsequently separated from the vehicle, largely freed from color bodies, by, for example, lowering the temperature of the solution, the color bodies remaining in solution in the substance carried by the vehicle. Where the procedure involves treatment of rosin in solution, a solution of rosin in suitable solvent is prepared, or rosin may be treated as found in drop liquor produced by the extraction of pine stump wood with suitable solvent, as a low boiling petroleum hydrocarbon, etc., after complete or partial removal therefrom of turpentine and pine oil. Where the procedure involves treatment of rosin in solution, the vehicle carrying the substance to render it effective or more effective by the vehicle is admixed with the rosin solution by heating, agitation or both, and subsequently separated therefrom, with or without refrigeration, together with color bodies of the rosin dissolved by the substance in its vehicle.

As illustrative of the practical adaptation of my invention, for example, to the refining of rosin with substances having the capacity for selectively dissolving color bodies contained in rosin, but which are not capable of highly efficient use due to the tendency to crystallize, for example, 75 grams of salicylic acid dissolved in 100 grams of ethylene glycol are admixed with 200 grams of gasoline-rosin solution containing, for example, 14% of wood rosin. The mixture is heated and then separated, for example, by gravity. The mixture will separate into a lower layer comprising salicylic acid and ethylene glycol in which the color bodies of the rosin extracted by the salicylic acid will be dissolved, and an upper layer comprising gasoline-rosin solution. The layers are separated and the gasoline-rosin solution washed with water and the gasoline evaporated for recovery of the refined rosin, of which about 16 grams rating K in color will be obtained. A similar procedure may be carried out with the use of 2,4-dichlorophenol, with p-cresol, etc. The separation of the substance and medium, as glycol or glycerin, from the gasoline-rosin solution may be effected normally at room temperature, though, if desired, the separation may be effected at reduced temperature and it will be noted that where the refining substance used is not readily soluble in the medium, as glycol or glycerin, at room temperature, as for example, in the case of salicylic acid, the operation will be carried out at an elevated temperature.

As a further illustration, for example, 75 grams of dry pyridine are shaken with 300 grams of gasoline-rosin solution and 25 grams of ethylene glycol. Separation of the rosin solution from the pyridine and glycol is effected by gravity at a temperature of say 25° C. and on evaporation of the gasoline a rosin grading about H will be obtained. Further, 100 grams of methanol is shaken with 350 grams of gasoline-rosin solution and 10 grams of glycol, the methanol and glycol being separated from the gasoline-rosin solution at a temperature of say 25° C. and the gasoline evaporated off for the recovery of 22 g. refined rosin.

Desirably, after the gasoline-rosin solution is separated from the refining substance and the glycol, it is given a wash or washes with glycol for the complete removal of any traces of the refining substance, as phenol, resorcinol, aniline, furfural, etc. For example, in effecting the refining of rosin with resorcinol 50 grams of resorcinol are refluxed for three hours with 400 grams of gasoline-rosin solution and the solution cooled to a temperature of about 25° C. The solution is then filtered and extracted say five times with 25 cc. portions of glycol. On separation of the gasoline-rosin solution from the resorcinol and glycol and evaporation of the gasoline, a high grade rosin will be obtained.

As a further illustration, for example, 10 grams of hexamethylenetetramine are dissolved in 100 grams of diethylene glycol and refluxed with 500 grams of gasoline-rosin solution containing 13% rosin. On settlement a lower layer comprising largely color bodies extracted from the rosin in solution in glycol and an upper layer comprising largely gasoline-rosin solution will be obtained. The gasoline-rosin solution is separated and washed with diethylene glycol and then with water. The rosin is recovered by distillation off of the gasoline and on distillation will give 39 parts of WW rosin which will yield a soap pale in color.

If desired, instead of using hexamethylenetetramine an equivalent result may be obtained by the addition of ammonia and formaldehyde with a condensing agent, as ammonium chloride, to the glycol or to the rosin solution in amounts sufficient to produce a desired amount of hexamethylenetetramine. Thus, for example, say about 20 parts of formaldehyde solution about 35% of formaldehyde and 15 parts of ammonia water containing about 30% of ammonia may be used in place of hexamethylenetetramine. If desired, instead of using ammonia water a suitable condensing agent as, for example, ammonium chloride, hydrochloric acid, tartaric acid, or the like, may be used. It will be understood that I contemplate the use of ammonia and formaldehyde as equivalent to the use of hexamethylenetetramine.

In carrying the method embodying my invention into practice, it will be understood that glycerin may be used in some cases equivalently for glycol and that while anhydrous glycol or glycerin is preferred, the presence of a few percent of water may not be harmful.

What I claim and desire to protect by Letters Patent is:

1. The method of removing color bodies from rosin which includes subjecting rosin to treatment with a liquid polyhydric alcohol and an alkali and separating the refined rosin from the polyhydric alcohol and the alkali.

2. The method of removing color bodies from rosin which includes subjecting rosin to treatment with a liquid polyhydric alcohol and a phenol capable, in the presence of a suitable polyhydric alcohol, of exerting a solvent action on color bodies of the rosin and separating the refined rosin from the polyhydric alcohol and the phenol.

3. The method of removing color bodies from rosin which includes subjecting rosin in solution in a solvent therefor to treatment with a liquid polyhydric alcohol and an alkali and separating the refined rosin solution from the polyhydric alcohol and the alkali.

4. The method of removing color bodies from rosin which includes subjecting rosin in solution in a solvent therefor to treatment with a liquid polyhydric alcohol and a phenol capable, in the presence of a suitable polyhydric alcohol, of exerting a solvent action on color bodies of the rosin and separating the refined rosin solution from the polyhydric alcohol and the phenol.

5. The method of removing color bodies from rosin which includes subjecting rosin in solution in a hydrocarbon solvent therefor to treatment with a liquid polyhydric alcohol and a phenol and separating the refined rosin solution from the polyhydric alcohol and the phenol.

6. The method of removing color bodies from rosin which includes subjecting rosin in solution in a solvent therefor to treatment with a liquid polyhydric alcohol and a non-substituted organic acid and separating the refined rosin solution from the polyhydric alcohol and organic acid.

7. The method of removing color bodies from rosin which includes subjecting rosin in solution in a solvent therefor to treatment with a liquid polyhydric alcohol and a monohydric alcohol, said monohydric alcohol being characterized by a capacity in the presence of a suitable polyhydric alcohol to exert a selective solvent action on the color bodies of the rosin, and separating the refined rosin solution from the said alcohols.

8. The method of removing color bodies from rosin which includes treating a solution of rosin in a hydrocarbon solvent with an organic substance, normally not an effective solvent for color bodies contained in rosin but having a capacity in the presence of a liquid polyhydric alcohol for selectively dissolving color bodies contained in rosin, in solution in a liquid polyhydric alcohol which is substantially immiscible with the rosin solution, and separating the refined rosin solution from said polyhydric alcohol solution.

9. The method of removing color bodies from wood rosin which includes treating a solution of wood rosin in a hydrocarbon solvent with an organic substance, normally not an effective solvent for color bodies contained in wood rosin, but having a capacity in the presence of a liquid polyhydric alcohol for selectively dissolving color bodies contained in wood rosin, in solution in a liquid polyhydric alcohol which is substantially immiscible with the wood rosin solution, and separating the refined wood rosin solution from said polyhydric alcohol solution.

10. The method of removing color bodies from rosin which includes treating a solution of rosin in a hydrocarbon solvent with an organic substance, normally not an effective solvent for color bodies contained in rosin, but having a capacity in the presence of a liquid polyhydric alcohol for selectively dissolving color bodies contained in rosin, in solution in a polyhydric alcohol selected from the group consisting of glycerol and glycols, and separating the refined rosin solution from said polyhydric alcohol solution.

11. The method of removing color bodies from rosin which includes treating a solution of rosin in a hydrocarbon solvent with a phenol, normally not an effective solvent for color bodies contained in rosin but having a capacity in the presence of a liquid polyhydric alcohol for selectively dissolving color bodies contained in rosin, in solution in a polyhydric alcohol selected from the group consisting of glycerol, ethylene glycol, propylene glycol and diethylene glycol.

12. The method of removing color bodies from rosin which includes treating a solution of rosin in a hydrocarbon solvent with a monohydric alcohol, normally not an effective solvent for color bodies contained in rosin but having a capacity in the presence of a liquid polyhydric alcohol for selectively dissolving color bodies contained in rosin, in solution in a polyhydric alcohol selected from the group consisting of glycerol, ethylene glycol, propylene glycol and diethylene glycol.

13. The method of removing color bodies from rosin which includes treating a solution of rosin in a hydrocarbon solvent with a non-substituted organic acid, normally not an effective solvent for color bodies contained in rosin but having a capacity in the presence of a liquid polyhydric alcohol for selectively dissolving color bodies contained in rosin, in solution in a polyhydric alcohol selected from the group consisting of glycerol, ethylene, propylene glycol and diethylene glycol.

IRVIN W. HUMPHREY.